(12) United States Patent
Auld et al.

(10) Patent No.: US 10,206,420 B2
(45) Date of Patent: Feb. 19, 2019

(54) METHODS FOR PREPARING ALGINATE-BASED COMPOSITIONS

(75) Inventors: Bryan Auld, New York, NY (US); Dominick D'Aleo, Belle Harbor, NY (US)

(73) Assignee: Gelus LLC, New York, NY (US)

( * ) Notice: Subject to any disclaimer, the term of this patent is extended or adjusted under 35 U.S.C. 154(b) by 160 days.

(21) Appl. No.: 13/453,640

(22) Filed: Apr. 23, 2012

(65) Prior Publication Data

US 2012/0269927 A1  Oct. 25, 2012

Related U.S. Application Data

(60) Provisional application No. 61/477,982, filed on Apr. 21, 2011.

(51) Int. Cl.
| | | |
|---|---|---|
| *A23L 1/00* | (2006.01) |
| *A23L 29/30* | (2016.01) |
| *A23L 5/00* | (2016.01) |
| *A23L 29/256* | (2016.01) |
| *A23L 29/269* | (2016.01) |

(52) U.S. Cl.
CPC .............. *A23L 29/30* (2016.08); *A23L 5/00* (2016.08); *A23L 29/256* (2016.08); *A23L 29/27* (2016.08)

(58) Field of Classification Search
CPC ......... A23L 29/256; A23L 29/30; A23L 29/27
USPC .............................. 426/61, 590, 592, 89, 103
See application file for complete search history.

(56) References Cited

U.S. PATENT DOCUMENTS

| | | | |
|---|---|---|---|
| 4,765,984 A | 8/1988 | Vellekoop et al. | |
| 2003/0124225 A1* | 7/2003 | West | A23G 3/36 |
| | | | 426/89 |
| 2007/0205199 A1 | 9/2007 | Wothers | |
| 2009/0155427 A1 | 6/2009 | Jobe et al. | |

FOREIGN PATENT DOCUMENTS

| | | | |
|---|---|---|---|
| WO | WO 2004/009456 | * | 1/2004 |
| WO | WO 2005/028607 | | 3/2005 |
| WO | WO 2008030121 A1 | * | 3/2008 |

OTHER PUBLICATIONS

International Search Report and Written Opinion dated Jul. 17, 2012 in International Application No. PCT/US12/34653.

\* cited by examiner

*Primary Examiner* — Vera Stulii
(74) *Attorney, Agent, or Firm* — Fish & Richardson P.C.

(57) ABSTRACT

Methods for preparing alginate-based compositions, as well as related compositions, food products, and articles, are disclosed.

40 Claims, 2 Drawing Sheets

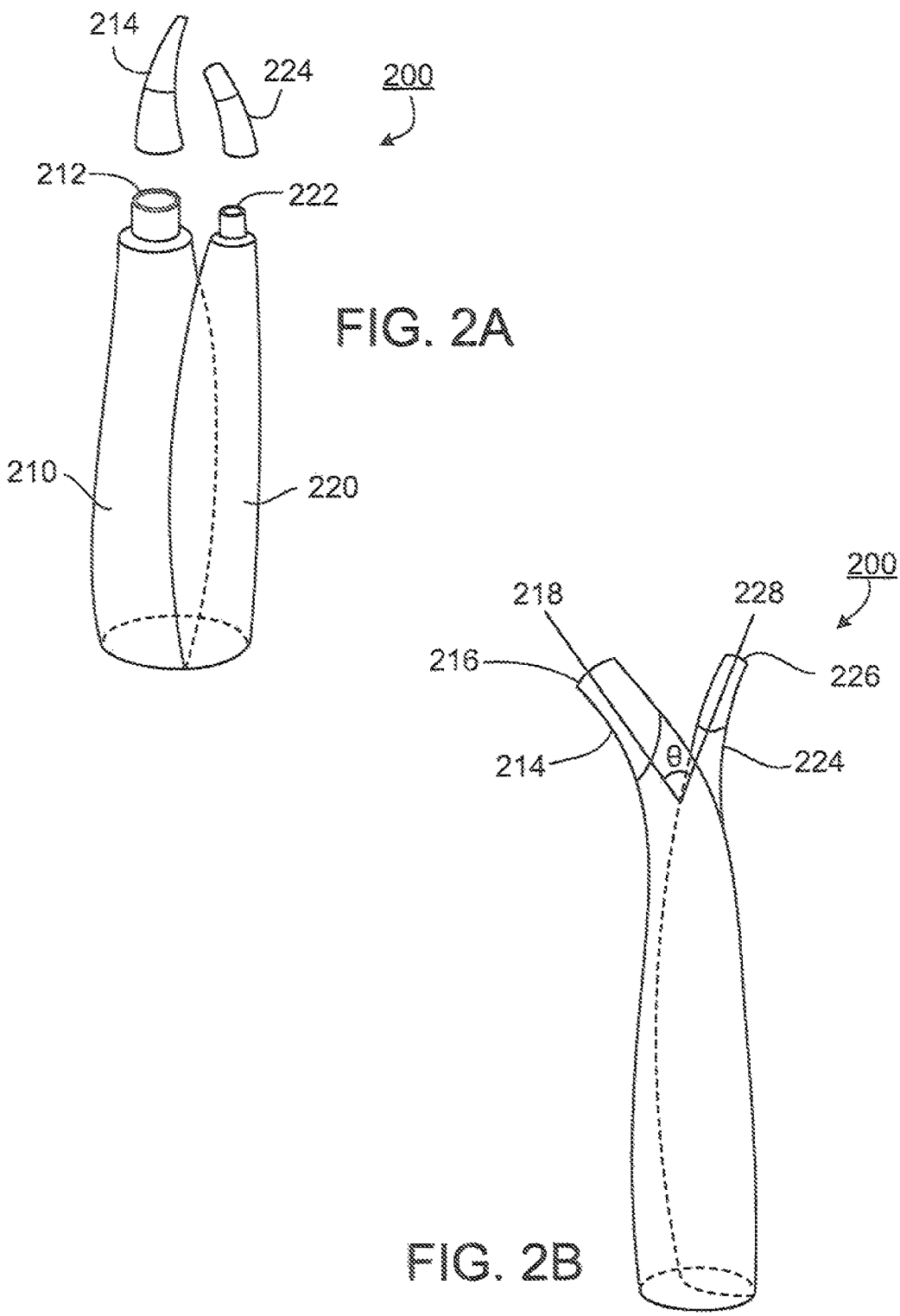

METHODS FOR PREPARING ALGINATE-BASED COMPOSITIONS

CROSS REFERENCE TO RELATED APPLICATION

This application claims priority under 35 U.S.C. § 119 to U.S. Provisional Application Ser. No. 61/477,982, filed Apr. 21, 2011, the contents of which are hereby incorporated by reference.

TECHNICAL FIELD

This disclosure relates to methods for preparing alginate-based compositions, as well as related compositions, food products, and articles.

BACKGROUND

A gelatin-based food product (e.g., a gelatin-based alcoholic food product such as a Jell-O shot) is typically formed by heating, followed by a lengthy cooling period. As a result, this preparation process can take a long time and can take up a large amount of cooling storage space. It is desirable to develop a gelatinous food product that can be formed instantaneously without the need of heating and/or cooling.

SUMMARY

This disclosure is based on findings that an alginate-based alcoholic food product can be formed instantaneously by adding a composition containing a multivalent salt to a composition containing an alginate alkali metal salt without heating and/or cooling. Such an alcoholic food product can be prepared in a venue licensed to dispense alcoholic beverages to a consumer and then sold to a consumer for immediate consumption in full compliance with the legal requirements.

In one aspect, this disclosure features an article for dispensing liquids. The article includes a first chamber having an opening; a first spout in fluid communication with the opening of the first chamber, the first spout having an opening facing a first direction; a second chamber having an opening; and a second spout in fluid communication with the opening of the second chamber, the second spout having an opening facing a second direction different from the first direction.

In another aspect, this disclosure features an article for dispensing liquids that includes first and second chambers, the first chamber contains a first liquid that includes an alginate alkali metal salt, and the second chamber contains a second liquid that includes a multivalent salt.

In another aspect, this disclosure features a composition that includes an alginate alkali metal salt, a viscosity adjusting agent, and a solvent.

In another aspect, this disclosure features a composition that includes a multivalent salt, an anti-bitterness agent, and a solvent.

In another aspect, this disclosure features a method that includes forming a first liquid containing an alginate alkali metal salt and an alcoholic beverage, and adding a second liquid containing a multivalent salt to the first liquid, thereby forming a sphere comprising a coating encapsulating the alcoholic beverage.

In another aspect, this disclosure features a food product that includes a first aqueous solution, a first encapsulating coating surrounding the first aqueous solution, a second aqueous solution surrounding the first encapsulating coating, and a second encapsulating coating surrounding the second aqueous solution. The food product can be in the shape of a bilayer sphere.

In another aspect, this disclosure features a food product that includes an aqueous solution containing an alginate alkali metal salt and a beverage; and an encapsulating coating surrounding the aqueous solution, the coating being formed between the alginate alkali metal salt and calcium lactate gluconate.

In another aspect, this disclosure features a composition that includes an alginate alkali metal salt; a thickening agent; and a solvent.

In another aspect, this disclosure features a composition that includes an alginate alkali metal salt; a pH buffer; and a solvent.

In still another aspect, this disclosure features a method that includes forming a first liquid containing an alginate alkali metal salt and a beverage (e.g., an alcoholic beverage); and adding a second liquid containing a multivalent salt to the first liquid, thereby forming a sphere containing a coating encapsulating the beverage.

Embodiments can include one or more of the following optional features.

In some embodiments, the first and second directions form an angle of at least about 45° (e.g., at least about 90°) and/or at most about 180° (e.g., at most about 135°).

In some embodiments, the first or second chamber includes a flow valve (e.g., a metered valve) in the opening of the first or second chamber. The flow valve can be capable of releasing from about 15 ml to about 60 ml of a liquid from the first or second chamber during each dispensation. In some embodiments, each of the first and second chambers includes a flow valve in its opening.

In some embodiments, the first chamber contains a first liquid that includes an alginate alkali metal salt (e.g., sodium alginate or potassium alginate). For example, the first liquid can include from about 0.5% by weight to about 5% by weight of the alginate alkali metal salt.

In some embodiments, the second chamber contains a second liquid that includes a multivalent salt (e.g., calcium chloride, magnesium chloride, or manganese chloride). For example, the second liquid can include from about 0.5% by weight to about 5% by weight of the multivalent salt.

In some embodiments, each of the first and second chambers has an opening. In such embodiments, the article can include a first spout in fluid communication with the opening of the first chamber and a second spout in fluid communication with the opening of the second chamber. The first spout can have an opening facing a first direction and the second spout can have an opening facing a second direction different from the first opening.

In some embodiments, the composition or the liquid containing an alginate alkali metal salt can further include a viscosity adjusting agent, such as an enzyme (e.g., a pectinase). For example, such a composition or liquid can include from about 0.01% by weight to about 1% by weight of the viscosity adjusting agent.

In some embodiments, the composition or the liquid containing a multivalent salt can further include an anti-bitterness agent (e.g., sodium benzoate, potassium sorbate, or inverted sugar). For example, such a composition or liquid can include from about 0.01% by weight to about 1% by weight of the anti-bitterness agent.

In some embodiments, the composition or the aqueous solution in the food product can include from about 0.5% by weight to about 5% by weight of the alginate alkali metal salt (e.g., sodium alginate or potassium alginate).

In some embodiments, the composition or the aqueous solution containing an alginate alkali metal salt can include a thickening agent, such as a polysaccharide (e.g., xanthan gum). For example, the composition or the aqueous solution can include from about 0.25% by weight to about 1% by weight of the thickening agent.

In some embodiments, the composition or the aqueous solution containing an alginate alkali metal salt can include a pH buffer, such as a pH buffer containing phosphoric acid or citric acid. For example, the composition or the aqueous solution can include from about 0.1% by weight to about 2% by weight of the pH buffer.

In some embodiments, the composition or the aqueous solution containing an alginate alkali metal salt can have a pH of at least about 4.5.

In some embodiments, the composition or the aqueous solution containing an alginate alkali metal salt can include a preservative (e.g., sodium benzoate, sodium metabisulfite, or potassium sorbate). For example, the composition or the aqueous solution can include from about 0.005% by weight to about 0.1% by weight of the preservative.

In some embodiments, the composition or the aqueous solution containing an alginate alkali metal salt can include a sweetener (e.g., a sugar, corn syrup, or an inverted sugar). For example, the aqueous solution can include from about 1.5% by weight to about 9% by weight of the sweetener.

In some embodiments, the solvent can include water (e.g., deionized water).

In some embodiments, the alcoholic beverage includes beer, wine, sherry, brandy, liqueurs, port, vodka, gin, whisky, scotch, cognac, tequila, rum, or champagne.

In some embodiments, the method is performed in a venue (e.g., a bar, a restaurant, a lounge, a pub, a night club) licensed to dispense alcoholic beverages to a consumer.

In some embodiments, the alginate alkali metal salt and the beverage in the first liquid can have a volume ratio from about 1:2 to about 2:1.

In some embodiments, the first liquid can be formed in a bottle having a volume of about 6 ounces. For example, the first liquid can be formed by adding about 4 ounces of the alginate alkali metal salt and about 2 ounces of the beverage into the bottle.

In some embodiments, the method can further include pouring at least a portion of the first liquid from the bottle into a container after the first liquid is formed. In such embodiments, the second liquid can then be added to the container containing the first liquid to form the sphere.

In some embodiments, the first aqueous solution and the first encapsulating coating in the bilayer sphere food product can include a first alginate metal alkali salt. In some embodiments, the first encapsulating coating can be formed between the first alginate metal alkali salt and calcium lactate gluconate.

In some embodiments, the second aqueous solution and the second encapsulating coating in the bilayer sphere food product can include a second alginate metal alkali salt.

In some embodiments, the second encapsulating coating can be formed between the second alginate metal alkali salt and calcium lactate gluconate.

In some embodiments, the first aqueous solution includes a first alcoholic beverage.

In some embodiments, the second aqueous solution includes a second alcoholic beverage.

Other features and advantages of the subject matter in this disclosure will be apparent from the description, drawings, and claims.

DESCRIPTION OF DRAWINGS

FIG. 2A is a perspective view of an embodiment of a dual-chamber bottle.

FIG. 2B is another perspective view of the dual-chamber bottle shown in FIG. 2A.

Like reference symbols in the various drawings indicate like elements.

DETAILED DESCRIPTION

Figure 1:
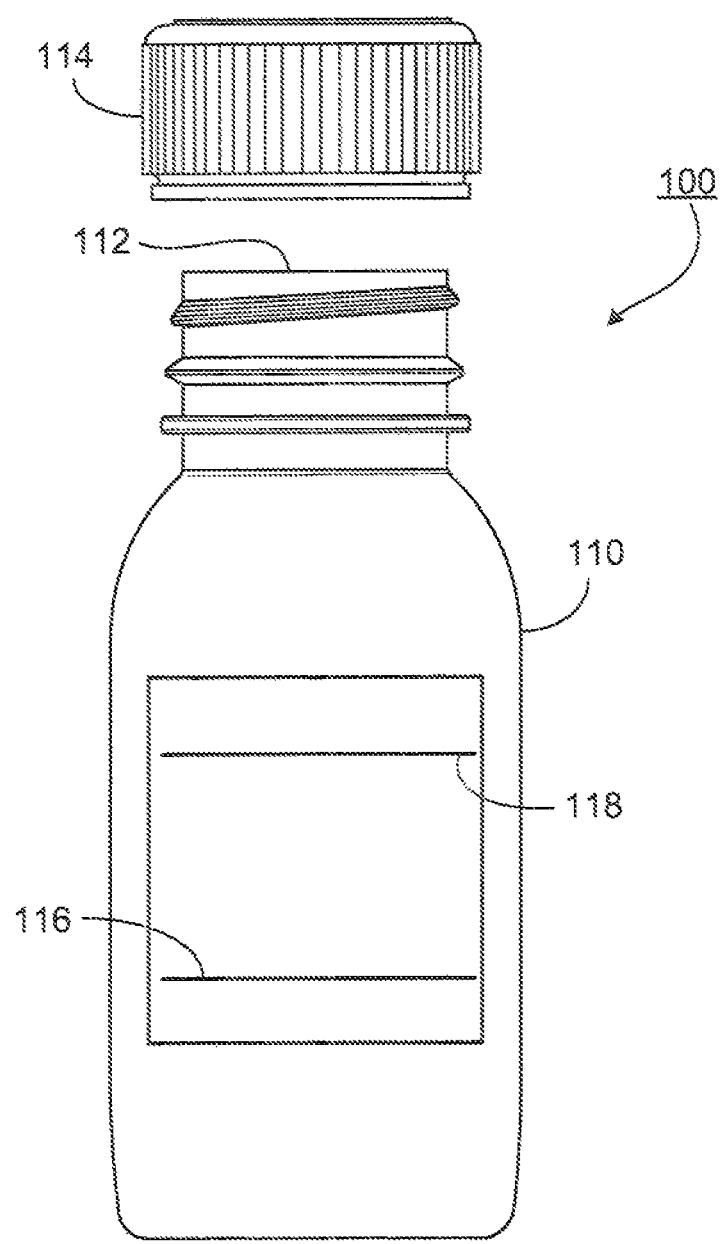
FIG. 1 is a perspective view of an embodiment of a bottle that can be used to make the food product in the shape of a sphere described herein.

In general, this disclosure relates to methods for preparing alginate-based compositions (e.g., food products), as well as related compositions and articles.

In some embodiments, an alginate-based food product (e.g., an alginate-based alcoholic food product) can be prepared by adding an aqueous composition containing a multivalent salt (referred to herein as "the second composition" or "the second liquid") to an aqueous composition containing an alginate alkali metal salt (referred to herein as "the first composition" or "the first liquid"). The resultant food product includes an aqueous solution encapsulated by a water-insoluble, alginate-based encapsulating coating.

The first composition generally includes an alginate alkali metal salt and a solvent. The alginate alkali metal salt can be formed between alginate anions and alkali metal cations. Examples of suitable alginate alkali metal salts include sodium alginate and potassium alginate. In some embodiments, the first composition can include from about 0.5% by weight to about 5% by weight (e.g., from about 1% by weight to about 4% by weight, from about 1.5% by weight to about 3% by weight, or from about 2% by weight to about 2.5% by weight) of the alginate alkali metal salt. Without wishing to be bound by theory, it is believed that, if the first composition contains less than about 0.5% by weight of the alginate alkali metal salt, it would not be effective in forming a water-insoluble, alginate-based encapsulating coating. Further, without wishing to be bound by theory, it is believed that, if the first composition contains more than about 5% by weight of the alginate alkali metal salt, it would be too viscous to be efficiently poured from its container or to allow the formation of spheres or beads having an encapsulating coating. In general, the first composition containing the alginate alkali metal salt in the amount described above can have a suitable viscosity (e.g., from about 150 cps to about 600 cps).

The solvent in the first composition can include water. In some embodiments, the first composition includes from about 60% by weight to about 99.5% by weight (e.g., from about 70% by weight to about 99.5% by weight, from about 80% by weight to about 99.5% by weight, from about 90% by weight to about 99.5% by weight, from about 95% by weight to about 99.5% by weight) of water. Preferably, the solvent includes deionized water (e.g., distilled water). Without wishing to be bound by theory, it is believed that it is advantageous to use deionized water as residual ions (e.g., calcium ions) in water could form precipitates with the alginate salt, thereby reducing the shelf life of the first composition.

In some embodiments, the first composition can further include a thickening agent. Examples of suitable thickening agents include polysaccharides, such as xanthan gum. In general, the first composition can include from about 0.25% by weight to about 1% by weight (e.g., from about 0.3% by weight to about 0.9% by weight, from about 0.35% by weight to about 0.8% by weight, or from about 0.4% by weight to about 0.7% by weight) of the thickening agent. Without wishing to be bound by theory, it is believed that adding a thickening agent to the first composition can result in remarkable improvement to the spherification process (e.g., better sphere integrity and consistency), especially when the first composition is mixed with a high alcohol and/or acid beverage. For example, adding a thickening agent (e.g., xanthan gum) to the first composition allows the first composition to be mixed with a large variety of alcoholic beverages with different viscosities to form spheres consistently with improved integrity.

In some embodiments, the first composition can further include a pH buffer to maintain and/or adjust its pH. Examples of suitable pH buffers include phosphoric acid and its salts or citric acid and its salts (e.g., sodium or potassium salts). The pH buffer can be formed by adding an acid alone to the first composition. The acid, together with the cations in the other ingredients in the first composition, can form the pH buffer. Alternatively, the pH buffer can be formed by directly adding an acid and its salts into the first composition. In general, the first composition can include from about 0.1% by weight to about 2% by weight (e.g., from about 0.1% by weight to about 1.5% by weight, from about 0.1% by weight to about 1% by weight, from about 0.1% by weight to about 0.5% by weight, or from about 0.1% by weight to about 0.2% by weight) of the pH buffer.

In some embodiments, the first composition can have a pH value of at least about 4.5 (e.g., at least about 5, at least about 5.5, or at least about 6) and/or at most about 8 (e.g., at most about 7.5, at most about 7, or at most about 6.5). Without wishing to be bound by theory, it is believed that, when the first composition has a pH below about 4.5, the acid in the first composition can degrade the alginate salt (e.g., by cleaving the alginate salt molecules) and can adversely impact the crosslinking process between the alginate salt and the multivalent salt in the second composition. In some embodiments, the first composition can further include a viscosity adjusting agent to modify the viscosity of the composition. Examples of suitable viscosity adjusting agents include enzymes, such as pectinases. In some embodiments, when the first composition contains a relatively large amount of the alginate alkali metal salt, a viscosity adjusting agent (e.g., a pectinase) can be added to reduce its viscosity so that the first composition can be readily poured out of a container. In general, the first composition can include from about 0.01% by weight to about 1% by weight (e.g., from about 0.1% by weight to about 0.9% by weight, from about 0.2% by weight to about 0.8% by weight, or from about 0.4% by weight to about 0.6% by weight) of the viscosity adjusting agent. In some embodiments, the thickening agent described above can also function as a viscosity adjusting agent.

In some embodiments, the first composition can further include a sweetener. Examples of suitable sweeteners include sugars, corn syrup, and inverted sugars. In general, the first composition can include from about 1.5% by weight to about 9% by weight (e.g., from about 2% by weight to about 8% by weight, from about 2% by weight to about 6% by weight, or from about 2% by weight to about 4% by weight) of the sweetener. Without wishing to be bound by theory, it is believed that, in addition to imparting sweetness to the first composition, including the above amount of a sweetener (e.g., a sugar, corn syrup, or an inverted sugar) can significantly improve the spherification process as the weight of the sweetener can prevent a sphere formed by the first composition from floating at the surface of the second composition that contains a multivalent salt, which can render a portion of the sphere not being able to touch the second composition and therefore not having sufficient mechanical strength or sphere integrity.

In some embodiments, the first composition can further include a preservative. Examples of suitable preservatives include sodium benzoate, sodium metabisulfite, or potassium sorbate. In general, the first composition can include from about 0.005% by weight to about 0.1% by weight (e.g., from about 0.01% by weight to about 0.1% by weight, from about 0.05% by weight to about 0.1% by weight, or from about 0.09% by weight to about 0.1% by weight) of the preservative. Without wishing to be bound by theory, it is believed that including the above amount of a preservative can effectively inhibit growth of bacteria, molds, or yeasts and extend shelf life of the first composition without imparting any undesired changes in taste, odor, viscosity, or color to the first composition.

In some embodiments, the first composition can be mixed with ethyl alcohol so that it can be used to prepare an alcoholic food product. For example, the first composition can be mixed with an ethyl alcohol to form a mixture containing from about 2% by weight to about 40% by weight (e.g., from about 5% by weight to about 30% by weight or from about 10% by weight to about 20% by weight) of the ethyl alcohol. The ethyl alcohol can be either added to the first composition immediately before the first composition is used to prepare an alcoholic food product or can be pre-mixed with the first composition and stored for an extended period of time. The ethyl alcohol can be added to the first composition either in a pure form or as an ingredient in an alcoholic beverage. In some embodiments, the first composition and the alcoholic beverage can have a volume ratio from about 2:1 to about 1:2, such as about 1:1.

In some embodiments, the first composition can further include one or more additives, such as natural or artificial flavoring agents, or natural or artificial coloring agents. Examples of flavoring agents include fruit juices (e.g., orange juice, apple juice, lime juice, or cranberry juice) or vegetable juices (e.g., tomato juice). The flavoring agents can have additional functions, such as bitterness reduction, sweetness enhancement, or acidity or alkaline modification. Examples of artificial coloring agents include FD&C, Blue No. 1, Blue No. 2, Green No. 3, Red No. 4, Red No. 3, Yellow No. 5, and Yellow No. 6. Examples of natural coloring agents include caramel E150, annatto E160b, chlorophyll E140, cochineal E120, betanin, turmeric E100, saffron E160a, paprika E160c, elderberry juice, pandan, and butterfly pea.

An example of a first composition contains 1.75 parts by weight of sodium alginate, 88.92 parts by weight of deionized water, 1.75 parts by weight of a phosphoric acid solution (which contains 85 wt % of phosphoric acid), 0.35 parts by weight of xanthan gum, 0.09 parts by weight of a potassium sorbate solution (which contains 10 wt % of potassium sorbate), 0.09 parts by weight of a sodium benzoate solution (which contains 10 wt % of sodium benzoate, 8.7 parts by weight of sugar, and 0.1 parts by weight of an artificial coloring agent.

The second composition generally includes a multivalent salt and a solvent (e.g., water). The "multivalent salt"

mentioned herein refers to salts containing a multivalent cation (e.g., $Ca^{2+}$, $Mg^{2+}$, or $Mn^{2+}$). Examples of suitable multivalent salts include calcium chloride, calcium lactate, calcium lactate gluconate, magnesium chloride, or manganese chloride. Without wishing to be bound by theory, it is believed that when the first and second compositions contact with each other, the multivalent cations in the second composition can cross-link the alginate molecules in the first composition (e.g., by forming coordination bonds with the alginate molecules) to form an encapsulating coating.

In some embodiments, the second composition can include from about 0.5% by weight to about 15% by weight (e.g., from about 1% by weight to about 12% by weight, from about 3% by weight to about 10% by weight, or from about 5% by weight to about 10% by weight) of the multivalent salt. Without wishing to be bound by theory, it is believed that, if the second composition contains less than about 0.5% by weight of the multivalent salt, it would not be effective in forming a water-insoluble, alginate-based encapsulating coating. Further, without wishing to be bound by theory, it is believed that, if the second composition contains more than about 15% by weight of the multivalent salt, it could have a relatively strong bitter taste or have a relatively short shelf life (e.g., by forming a precipitate). Preferably, the second composition includes calcium lactate gluconate as a multivalent salt. Without wishing to be bound by theory, it is believed that calcium lactate gluconate has neutral taste and can stay dissolved in water for a longer period of time compared to other multivalent salts (such as calcium chloride). As a result, a relatively large amount (e.g., at least about 10 wt %) of calcium lactate gluconate can be added into the second composition, which can form a sphere with improved integrity when the second composition is in contact with the first composition. By contrast, a second composition containing 5 wt % or more of calcium chloride can form a precipitate in a relative short period of time.

The solvent in the second composition can include water. In some embodiments, the second composition includes from about 60% by weight to about 99.5% by weight (e.g., from about 70% by weight to about 99.5% by weight, from about 80% by weight to about 99.5% by weight, from about 90% by weight to about 99.5% by weight, from about 95% by weight to about 99.5% by weight) of water.

In some embodiments, the second composition can further include an anti-bitterness agent. Examples of suitable anti-bitterness agents include sodium benzoate, potassium sorbate, or inverted sugar. In some embodiments, when the second composition contains a relatively large amount of the multivalent salt, an anti-bitterness agent (e.g., sodium benzoate, potassium sorbate, or inverted sugar) can be added to cover or eliminate the bitter taste of the second composition. In general, the second composition can include from about 0.001% by weight to about 1% by weight (e.g., from about 0.1% by weight to about 0.9% by weight, from about 0.2% by weight to about 0.8% by weight, or from about 0.4% by weight to about 0.6% by weight) of the anti-bitterness agent. In some embodiments, certain anti-bitterness agent can also function as a preservative (e.g., sodium benzoate or potassium sorbate) or a sweetener (e.g., an inverted sugar).

In some embodiments, the second composition can further include a pH buffer to maintain and/or adjust its pH. Examples of suitable pH buffers include phosphoric acid and its salts or citric acid and its salts (e.g., sodium or potassium salts). The pH buffer can be formed by adding an acid alone to the second composition. The acid, together with the cations in the other ingredients in the second composition, can form the pH buffer. Alternatively, the pH buffer can be formed by directly adding an acid and its salts into the second composition. In general, the second composition can include from about 0.1% by weight to about 2% by weight (e.g., from about 0.1% by weight to about 1.5% by weight, from about 0.1% by weight to about 1% by weight, from about 0.1% by weight to about 0.5% by weight, or from about 0.1% by weight to about 0.2% by weight) of the pH buffer. In some embodiments, the second composition can be mixed with ethyl alcohol so that it can be used to prepare an alcoholic food product. For example, the second composition can be mixed with ethyl alcohol to form a mixture containing about 2% by weight to about 40% by weight (e.g., from about 5% by weight to about 30% by weight or from about 10% by weight to about 20% by weight) of the ethyl alcohol. The ethyl alcohol can be either added to the second composition immediately before the second composition is used to prepare an alcoholic food product or can be pre-mixed with the second composition and stored for an extended period of time. The ethyl alcohol can be added to the second composition either in a pure form or as an ingredient in an alcoholic beverage.

In some embodiments, the second composition can further include one or more additives, such as those described above in connection with the first composition.

An example of a second composition contains 10 parts by weight of calcium lactate gluconate, 88.05 parts by weight of water, 1.75 parts by weight of a phosphoric acid solution (which contains 85 wt % of phosphoric acid), 0.1 parts by weight of a potassium sorbate solution (which contains 10 wt % of potassium sorbate), and 0.1 parts by weight of a sodium benzoate solution (which contains 10 wt % of sodium benzoate).

In some embodiments, both the first and second compositions contain ethyl alcohol.

In general, the ingredients in the first and second compositions can be obtained from commercial sources.

In general, the alginate-based food product described herein is prepared by adding the second composition to the first composition. For example, a certain amount (e.g., about 5 mL) of the first composition can be first poured into a container (e.g., a glass such as a cocktail glass). The second composition can then be added into the glass. Upon contact, the alkali metal cations in the first composition are exchanged by the multivalent cations in the second composition, thereby forming instantaneously a water-insoluble encapsulating coating on the surface of the first composition through the cross-linking of alginate molecules. The resultant food product is a sphere (or ball) containing an aqueous solution encapsulated by the coating. As the encapsulating coating is formed by cross-linking of alginate molecules, the sphere thus formed can be free of gelatin and does not require heating and cooling. Without wishing to be bound by theory, it is believed that adding the second composition into the first composition generally can form a sphere with a size larger than that formed by adding the first composition into the second composition. For example, the sphere formed by the method described above can have a diameter of at least about 1.1 cm (e.g., at least about 1.5 cm, at least about 2 cm, at least about 2.5 cm, at least about 3 cm, at least about 3.5 cm, or at least about 4 cm) and/or at most about 8 cm (e.g., at most about 7.5 cm, at most about 7 cm, at most about 6.5 cm, at most about 6 cm, at most about 5.5 cm, or at most about 5 cm). By contrast, the sphere formed by adding the first composition into the second composition generally has a diameter of less than about 1 cm.

In some embodiments, a food product in the form of a sphere can be formed by the following approach: About four ounces of the first composition can first be added into a bottle that has a volume of about six ounces and has a volume indicator (e.g., a line) indicating the level of the first composition when it reaches four ounces. Subsequently, an alcoholic beverage can be added to the bottle to fill up the remaining volume (i.e., 2 ounces). After the alcoholic beverage is mixed with the first composition in the bottle (e.g., by shaking the bottle vigorously) to form a first liquid, at least a portion (e.g., all) of the first liquid can be poured into a container (e.g., a glass). A sphere can then be formed by adding a sufficient amount (e.g., an amount sufficient to immerse the first liquid in the container) of a second composition into the container. Without wishing to be bound by theory, it is believed that an advantage of this approach is that, by using a bottle having an indicator indicating the level of four ounces of its content, a consumer can readily make, without using any additional measurement tools, a first liquid that contains the first composition and an alcoholic beverage in about 2:1 ratio, which can ensure formation of a sphere when different alcoholic beverages are used. In addition, another advantage of the above approach is that, by using a six-ounce bottle, the bottle can be used as a single-serving shot bottle so that its contents can be consumed right after the bottle is opened. This allows the first composition to be marketed as a single-use, non-refrigerated, shelf-stable product.

FIG. 1 shows a six-ounce bottle 100 having a bottle body 110, a bottle opening 112, and a bottle cap 114. Bottle body 110 includes two fill lines (or volume indicators) 116 and 118. Bottom fill line 116 indicates about ⅓ of the volume (i.e., about 2 ounces) of the bottle. Top fill line 118 indicates about ⅔ of the volume (i.e., about 4 ounces) of the bottle. During use, a consumer can pour the first composition (i.e., containing an alginate metal alkali salt) into bottle 100 until the first composition reaches the top fill line 118. An alcoholic beverage can then be added to bottle 100 to fill up the remaining volume (i.e., 2 ounces) of the bottle. After bottle 100 is closed by bottle cap 114, bottle 100 can be shaken vigorously to thoroughly mix the alcoholic beverage with the first composition to form a first liquid, which can be used to form a sphere following the method described in the preceding paragraph. In some embodiments, a consumer can pour the first composition into bottle 100 until the first composition reaches the bottle fill line 116 and then add an alcoholic beverage to fill up the remaining volume (i.e., 4 ounces) of the bottle. The mixture can then be used to form a sphere following the method described above. As indicated above, by using bottle 100, a consumer can ensure formation of a sphere when different alcoholic beverages are used without using any additional measurement tools.

In some embodiments, bottle opening 112 can have a relatively large diameter (e.g., about 38 mm), which allow bottle 100 to have improved capability to pour its contents from the bottle when compared to a bottle having a conventional opening with a diameter of 28 mm, especially when the contents (e.g., a composition containing an alginate metal alkali salt) have a relatively large viscosity.

In some embodiments, the alginate-based food product prepared by the method described above can be non-alcoholic. For example, the food product can be a sphere containing a fruit juice (e.g., orange juice, apple juice, lime juice, or cranberry juice) or a vegetable juice (e.g., tomato juice).

In some embodiments, the alginate-based food product prepared by the method described above can be alcoholic. For example, the food product can be a sphere containing an alcoholic beverage. Examples of alcoholic beverages include beer, wine, sherry, brandy, liqueurs, port, vodka, gin, whisky, scotch, cognac, tequila, rum, or champagne. In some embodiments, to prepare an alginate-based alcoholic food product, one can first mix the first composition containing no alcohol with an alcoholic beverage at a certain weight ratio (e.g., from about 1:2 to about 2:1, such as about 1:1). The second composition (either containing an alcohol or not) can then be added to the composition thus obtained to form the alginate-based alcoholic food product.

As an alginate-based alcoholic food product can be formed instantaneously by the method described above, it can be prepared in front of a consumer in a venue that is licensed to dispense alcoholic beverages (e.g., a bar, a restaurant, a lounge, a pub, a night club) and then sold to the consumer for immediate consumption while still fully complying with the legal requirements. By contrast, a conventional gelatinous alcoholic food product (e.g., a Jell-O shot) is typically formed by heating, followed by a lengthy cooling period. As a result, such a gelatinous alcoholic food product cannot be formed in front of a consumer and has to be pre-formed before sale. In New York State and certain other jurisdictions, pre-formed or pre-mixed alcoholic beverages are legal only if the alcoholic beverages are sealed, labeled with full disclosure of ingredients, certified by the U.S. Food and Drug Administration (FDA), and made on-premise, in the FDA approved kitchen area of the venue holding the liquor license. Further, the liquor used in an alcoholic beverage must be purchased under that particular venue's liquor license. As such, a conventional gelatinous alcoholic product (which is generally gelatin based) would not meet the regulations above due to the lengthy process used to make such a product.

In some embodiments, the method described above can also be used to prepare a multilayer food product, such as a food product containing an encapsulated aqueous solution surrounded by another encapsulated aqueous solution. As an example, one can first add a relatively small amount (e.g., about 2 mL) of the first composition into a glass (e.g., a cocktail glass). The second composition can then be added into the glass to form a sphere containing a first aqueous solution surrounded by a first encapsulating coating, which is formed between the alginate metal alkali salt (e.g., sodium alginate) in the first composition and a multivalent salt (e.g., calcium lactate gluconate) in the second composition. After any excess of the second composition is removed (e.g., by filtration or decantation), a relatively large amount of (e.g., about 5 mL) of a third aqueous composition containing an alginate alkali metal salt (which can include the ingredients described above in connection with the first composition) is added to the glass so that the sphere formed above is immersed in the third aqueous composition. A fourth aqueous composition containing a multivalent salt (which can include the ingredients described above in connection with the second composition) can then be added to the glass to form a second encapsulating coating surrounding the third aqueous composition. The second encapsulating coating is formed between the alginate metal alkali salt (e.g., sodium alginate) in the third composition and a multivalent salt (e.g., calcium lactate gluconate) in the fourth composition. The food product thus formed is a bilayer sphere containing an encapsulated aqueous solution surrounded by another encapsulated aqueous solution. A food product containing more than two layers of aqueous solutions can be prepared using the same method by adding additional encapsulated aqueous solutions to the outer surface of the second encapsulating coating.

In general, the alginate alkali metal salt in the first composition described in the preceding paragraph can be the same as or different from that in the third composition. Similarly, the multivalent salt in the second composition described in the preceding paragraph can be the same as or different from that in the fourth composition.

In some embodiments, the first and third compositions described above can include first and second alcoholic beverages, respectively. For example, the first and second alcoholic beverages can be beer, wine, sherry, brandy, liqueurs, port, vodka, gin, whisky, scotch, cognac, tequila, rum, or champagne. In such embodiments, the first and second alcoholic beverages can be the same or can be different. In some embodiments, one of the first and third compositions can include a non-alcoholic beverage and the other of the first and third compositions can include an alcoholic beverage.

During use, the first and second compositions described above can be included in a dual-chamber bottle, which can dispense the first and second compositions in front of a consumer to instantaneously form an alginate-based food product as described herein. FIG. 2A shows an embodiment of such a dual-chamber bottle. As shown in FIG. 2A, a dual-chamber bottle 200 includes a first chamber 210 having an opening 212 and a second chamber 220 having an opening 222. Bottle 200 includes a first spout 214 in fluid communication with opening 212 and a second spout 224 in fluid communication with opening 222. As shown in FIG. 2B, first spout 214 has an opening 216 facing a first direction 218 and second spout 224 has an opening 226 facing a second direction 228. As used herein, the direction that an opening of a spout is facing refers to the direction perpendicular to that opening. In some embodiments, first direction 218 and second direction 228 form an angle θ of at least about 45° (e.g., at least about 60°, at least about 75°, or at least about 90°) and/or at most about 180° (e.g., at most about 165°, at most about 150, or at most about 135°). Without wishing to be bound by theory, it is believed that forming an angle θ of at least about 45° between first direction 218 and second direction 228 enables a user to dispense the content from one of the two chambers of bottle 200 without the need to close the opening of the other chamber.

In some embodiments, first chamber 210 or second chamber 220 can include a flow valve (not shown in FIGS. 2A and 2B) in its opening that can control the flow of the composition in the chamber. In some embodiments, the flow valve can be a metered valve that is capable of releasing a pre-determined amount of the composition from the chamber. For example, the valve can release at least about 15 ml (e.g., at least about 20 ml, at least about 25 ml, at least about 30 ml) and/or at most about 60 ml (e.g., at most about 55 ml, at most about 50 ml, at most about 45 ml) of the composition from the chamber during each dispensation. In some embodiments, each of first chamber 210 and second chamber 220 include a flow valve (e.g., a metered valve).

In some embodiments, first chamber 210 can include the first composition described above and second chamber 220 can include the second composition described above. During use, one can dispense a pre-determined amount (e.g., about 1 oz.) of the first composition from first chamber 210 into a container (e.g., a glass), followed by dispensing a pre-determined amount (e.g., about 0.5 oz.) of the second composition from second chamber 220 into the same container. The container can then be gyrated until a sphere is formed and is separated from the wall of the container. If necessary, any excess fluid can be removed (e.g., by filtration or decantation). The sphere can then be consumed by a consumer. If an alcoholic beverage is desired, a pre-determined amount (e.g., about 1 oz.) of the alcohol of choice (e.g., vodka) can then be mixed with the first composition before the second composition is added to the container. As the alginate-based alcoholic sphere is formed instantaneously, it can be served in a venue licensed to dispense alcoholic beverages in full compliance with the local rules and regulations.

Other embodiments are in the claims.

What is claimed is:

1. A food product, comprising an aqueous solution containing an alginate alkali metal salt and an alcoholic beverage, and a water-insoluble, alginate-based coating encapsulating the aqueous solution, the food product being obtained by a method comprising:
   forming a first liquid comprising the alginate alkali metal salt and the alcoholic beverage;
   forming a second liquid comprising a multivalent salt;
   adding the second liquid to the first liquid;
   thereby forming a sphere comprising the water-insoluble, alginate-based coating encapsulating the alcoholic beverage, the sphere having a diameter of at least about 1.1 cm;
   wherein the first liquid comprises from about 0.5% by weight to about 5% by weight of the alginate alkali metal salt and the second liquid comprises from about 0.5% by weight to about 15% by weight of the multivalent salt.

2. The food product of claim 1, wherein the alginate alkali salt is sodium alginate or potassium alginate.

3. The food product of claim 1, wherein the alginate alkali metal salt is from about 1% by weight to about 2.5% by weight of the first liquid.

4. The food product of claim 1, wherein the aqueous solution has a pH of at least about 4.5.

5. The food product of claim 1, wherein the first liquid further comprises a sweetener and the sweetener is a sugar, corn syrup, or an inverted sugar.

6. The food product of claim 5, wherein the sweetener is from about 1.5% by weight to about 9% by weight of the first liquid.

7. The food product of claim 1, wherein the multivalent salt is a calcium salt.

8. The food product of claim 7, wherein the calcium salt is calcium chloride, calcium lactate, or calcium lactate gluconate.

9. The food product of claim 1, wherein the food product is free of gelatin.

10. The food product of claim 1, wherein the first liquid has a viscosity of from about 150 cPs to about 600 cPs.

11. The food product of claim 1, wherein the alcoholic beverage is beer, wine, sherry, brandy, liqueurs, port, vodka, gin, whisky, scotch, cognac, tequila, rum, or champagne.

12. The food product of claim 1, wherein the multivalent salt is from about 1% by weight to about 12% by weight of the second liquid.

13. A method for forming a food product comprising an aqueous solution containing an alginate alkali metal salt and an alcoholic beverage, and a water-insoluble, alginate-based coating encapsulating the aqueous solution, the method comprising:
   forming a first liquid comprising the alginate alkali metal salt and the alcoholic beverage;
   forming a second liquid comprising a multivalent salt;
   adding the second liquid to the first liquid;

thereby forming a sphere comprising the water-insoluble, alginate-based coating encapsulating the alcoholic beverage, the sphere having a diameter of at least about 1.1 cm;

wherein the first liquid comprises from about 0.5% by weight to about 5% by weight of the alginate alkali metal salt and the second liquid comprises from about 0.5% by weight to about 15% by weight of the multivalent salt.

14. The method of claim 13, wherein the first liquid further comprises a thickening agent.

15. The method of claim 14, wherein the thickening agent is a polysaccharide.

16. The method of claim 15, wherein the polysaccharide is xanthan gum.

17. The method of claim 14, wherein the first liquid comprises from about 0.25% by weight to about 1% by weight of the thickening agent.

18. The method of claim 13, wherein the alginate alkali salt is sodium alginate or potassium alginate.

19. The method of claim 13, wherein the alginate alkali metal salt is from about 1% by weight to about 2.5% by weight of the first liquid.

20. The method of claim 13, wherein the first liquid further comprises a solvent.

21. The method of claim 20, wherein the first liquid comprises deionized water.

22. The method of claim 13, wherein the first liquid further comprises a pH buffer.

23. The method of claim 22, wherein the pH buffer comprises phosphoric acid or citric acid.

24. The method of claim 22, wherein the pH buffer is from about 0.1% by weight to about 2% by weight of the first liquid.

25. The method of claim 13, wherein the first liquid has a pH of at least about 4.5.

26. The method of claim 13, wherein the first liquid further comprises a viscosity adjusting agent.

27. The method of claim 26, wherein the viscosity adjusting agent comprises an enzyme.

28. The method of claim 27, wherein the enzyme is a pectinase.

29. The method of claim 26, wherein the viscosity adjusting agent is from about 0.01% by weight to about 1% by weight of the first liquid.

30. The method of claim 13, wherein the first liquid further comprises a preservative.

31. The method of claim 30, wherein the preservative comprises sodium benzoate, sodium metabisulfite, or potassium sorbate.

32. The method of claim 30, wherein the preservative is from about 0.005% by weight to about 0.1% by weight of the first liquid.

33. The method of claim 13, wherein the first liquid further comprises a sweetener.

34. The method of claim 33, wherein the sweetener is a sugar, corn syrup, or an inverted sugar.

35. The method of claim 33, wherein the sweetener is from about 1.5% by weight to about 9% by weight of the first liquid.

36. The method of claim 13, wherein the first liquid has a viscosity of from about 150 cPs to about 600 cPs.

37. The method of claim 13, wherein the multivalent salt is a calcium salt.

38. The method of claim 37, wherein the calcium salt is calcium chloride, calcium lactate, or calcium lactate gluconate.

39. The method of claim 13, wherein the multivalent salt is from about 1% by weight to about 12% by weight of the second liquid.

40. The method of claim 13, wherein the food product is free of gelatin.

* * * * *